Sept. 27, 1938.  G. L. HELLER ET AL  2,131,686
GRANULAR CARBON BLACK AND METHOD FOR MANUFACTURE
Filed May 9, 1936
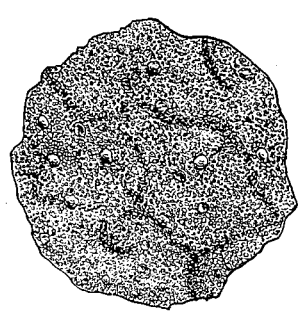
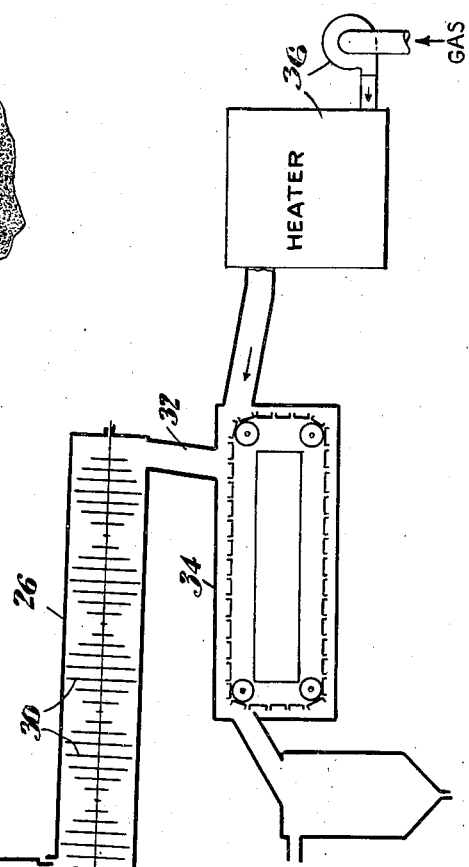
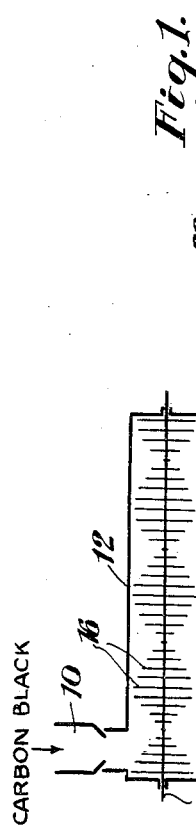
INVENTORS
GEORGE L. HELLER
CARL W. SNOW
BY
ATTORNEY Patented Sept. 27, 1938

2,131,686

UNITED STATES PATENT OFFICE 2,131,686

GRANULAR CARBON BLACK AND METHOD FOR MANUFACTURE

George L. Heller and Carl W. Snow, Pampa, Tex., assignors to General Atlas Carbon Company, Dover, Del., a corporation of Delaware Application May 9, 1936, Serial No. 78,836

5 Claims. (Cl. 134—60)

This invention relates to the agglomeration or pebbling of carbon black, and particularly concerns a new form of granular black and process of making the same.

Carbon black as originally produced by dissociation of hydrocarbons, and as commonly employed in the art of rubber compounding, is a finely divided impalpable powder which is extremely difficult to handle because of its light bulk and dusty character. As originally produced carbon black usually has an apparent density of 3 to 5 pounds per cubic foot and an apparent individual particle diameter in the range of .05 to 1 micron. It is the small size of these individual particles which imparts to the black its colloidal properties of uniform dispersibility in rubber, oils, resins, etc. Even these apparent individual particles, however, are in reality themselves primary agglomerates of smaller particles which are invisible to the most powerful microscope.

The primary object of the present invention is to provide an improved process for efficiently and economically agglomerating carbon black to a granular condition in which it is free-flowing, non-dusting, sufficiently strong to withstand handling, and retains its original property of uniform dispersibility when milled with rubber, oil, or the like.

It has long been known that carbon black can be agglomerated to a granular condition through the mixing and wetting of the particles of black with a suitable liquid such as gasoline or kerosene, and their concretion into grains. A feature of the present invention resides in the discovery that under properly controlled conditions of wetting and agitation, carbon black can be agglomerated by means of a single phase liquid such as water to produce a free-flowing, non-dusting granular product which is readily and uniformly dispersible when milled with rubber or oil, and which is stronger and denser than similar granular black prepared by using other wetting agents such as kerosene, gasoline, etc. Another feature which is unique is that this process is applicable to all types of carbon black, including the "soft blacks" and lampblack in an economical and efficient manner. It has been found that this process will convert above 90% of the dry powder to agglomerates ranging between 40 mesh and 10 mesh on screening.

With the above and other objects and features in view, the invention consists in the improved granular black and method for agglomerating carbon black to produce this product, as hereinafter described and more particularly defined by the accompanying claims.

In the following description reference will be made to the accompanying drawing, in which Fig. 1 is a diagrammatic flow diagram of apparatus adapted for practicing the invention; and Fig. 2 is a sectional view of a single grain of the granular product, magnified.

Referring to the accompanying flow diagram, the finely divided black which is to be agglomerated is continuously charged from a hopper 10 into a horizontal tubular conveyor 12 of the screw conveyor type. Instead of the usual flights comprising a screw conveyor, conveyor 12 is shown equipped with an axially mounted rotating shaft 14 carrying radial rods 16 having a length about 1" less than the internal diameter of the conveyor, disposed at uniform longitudinally and angularly spaced distances throughout its length. It has been found that a conveyor of this design having a length about six times its diameter and having a central shaft with radial rods set about 1" apart and spaced 45° radially, rotated at about 30 R. P. M., will increase the density of black about 100% while conveying it under unidirectional rotation of the rods, from one end of the conveyor to the other. This densing effect is apparently the result of a number of factors including (a) agitation of the black while mechanically conveying it through the conveyor 12 which is completely filled with black being forced therethrough by the rotation of the conveying and agitating mechanism, and (b) the agglomerating and impacting action of the rods 16 to which the particles of black adhere and then build up by impact into larger particles which are less adherent and therefore drop off the rods, as the rods are forcibly drawn through the body of dry particles. The amount of increase in apparent density of the black which is effected by this operation may be controlled by varying the rate of rotation of shaft 14. The more the black is pre-densed, the greater the efficiency of the subsequent wetting and agglomerating operations.

After pre-densing the black to the desired degree (preferably to at least 12–15 pounds cu. ft.) in unit 12, the black is continuously discharged into the feed end of a mixer 18. Mixer 18 is a cylindrical tube or trough which may be mounted horizontally, but is preferably mounted with its major axis tilted from the horizontal so that the discharge end is a few inches higher than the feed end. The agitator element in the mixer preferably comprises an axial rotating shaft 20 on which radial rods 22 are mounted at uniformly spaced distances both longitudinally and angularly throughout the length of the shaft. One such mixer which worked satisfactorily consisted of a cylinder 20" in diameter and 60" long having an inner enamel lining and equipped with an axial rotating shaft 20 with rods 22 of ⅜" diameter and 19¾" length mounted radially on the shaft to extend diametrically of the cylinder at 1½" longitudinal spacing and 22½° radial spacing between adjacent rods. Each end of a rod 22 functions as an agitating finger rotating within the cylinder at the rate of 180 R. P. M. In moving through a unit inch and a half length of path beginning in the plane of rotation of one rod and ending in the plane of rotation of the next adjacent rod, a unit volume of the charge of black in the mixer is impacted by both ends of the rod at one end of the inch and a half path and also by both ends of the rod at the other end of the inch and a half path. In other words the charge in each thus measured unit inch and a half length of the mixer is impacted at the rate of twelve impacts per second, or at the rate of approximately eight impacts per second per linear inch of path. However, in moving through an inch and a half length of path having its center point located directly in the vertical plane of rotation of the two ends of one rod, the black would only be impacted by those two fingers and therefore would receive impacts at the rate of six per second per linear inch and a half of path, or at the rate of approximately four per second per linear inch of path. The charge advances through the mixer very slowly at a rate far less than a linear inch per second. It will thus be apparent that the charge in the mixer is subjected to impacts by the rotating fingers at an average rate of four to eight per second per linear inch of path followed by the charge through the mixer.

The dry preferably pre-densed black which enters the mixer is sprayed with water supplied at air temperature from one or more sprays 24, as the black is fed into the feed end of mixer 18. By means of valves and a meter 25 the amount of water is accurately proportioned to the rate of supply of dry black to the mixer so that the water and black are usually mixed in the proportion of approximately 48% water–52% black by weight. The allowable proportions of liquid and black vary for the material and liquid but lie within the range from 35% to 65% liquid by weight of finished wet product. For example, using water for the liquid, commercial rubber channel black may require as much as 56% water, while the "soft blacks" may require as little as 43% water by weight of product. By rotating the mixer shaft at a speed of about 180 R. P. M. it has been found possible to partially wet the black and agglomerate the wetted particles into small nucleal granules during its passage from the feed to the discharge end of mixer 18. By rotating the mixer shaft at this speed the black and water are both kept in a state of finely divided suspension during the wetting operation. The tilted position of the mixer helps to hold the water and dry black in the lower feed end, while the agglomerate nuclei are selectively conveyed by the uni-directional rotation of rods or fingers 22 toward the higher discharge end of the mixer.

From the discharge end of mixer 18 the moist nucleal granules are delivered to the feed end of an agglomerating cylindrical agitator 26 which is preferably lined with enamel. It has been found that the agitator 26 should be proportioned relative to the mixer so that it is of about the same or greater length, and half the diameter, of the mixer. Also it is advantageous though not necessary, to have the agitator slightly tilted so that its discharge end is a few inches (2"–4") lower than the inlet end in order to permit of a certain amount of gravity classification of the granules as they are conveyed therethrough. The agitating element of member 26 preferably comprises an axial shaft 28 with radial rods 30 mounted thereon at uniform longitudinal and radial spacings, and rotated at about one-half the rate of speed of the agitator element of mixer 18. A satisfactory assemblage for member 26 was found to be a trough having a cylindrical bottom of 6" radius and 60" long having rods 3/8" in diameter, 11 3/4" long spaced 1 1/2" longitudinally and 30° radially on a shaft 28 rotated at a speed of 90 R. P. M. During passage through agitator 26 the small moist nucleal granules are built up and agglomerated into fairly uniformly sized dense grains of rounded contour and uniformly porous but relatively strong texture. These grains are composed of a large number of nuclei and possess no particularly uniform shape but may be made essentially spherical by prolonged agitation in member 26.

From the discharge end of agglomerator 26 the moist granular product is conducted by a chute 32 into a drier 34 wherein the black granules are subjected to rapid (flash) drying by means of a current of high temperature gas or air blown thereover from a blower-heater unit 36. The temperature to which the granules are subjected in drier 34 may advantageously be as high as 400–600° F. in order to rapidly and completely dry the granules. The dried granular product has an apparent density in the neighborhood of 25–40 pounds per cubic ft. Approximately 90% of this granular product will pass through a standard 10 mesh screen but only about 2% will pass through a 40 mesh screen. Only about half of the product passing through the 10 mesh will pass through a 16 mesh screen. A yield has been obtained as high as 95% of product passing through a 10 mesh and retained by a 40 mesh screen.

Carbon black is wetted much more readily by many liquids than by water, as for example concentrated acetic acid, alcohols, benzene, or acetone. Nevertheless the efficiency of any particular liquid in effecting agglomeration of carbon black is not entirely the result of its ability or rapidity in wetting the black but rather the combination of ability to wet and yet wet slow enough so that the liquid may be dispersed in small droplets before the formation of the nuclei is completed. Thus benzene wets so rapidly that it cannot be used, as do all liquids having a specific inductive capacity less than 10 (see chemical handbook for values).

If care is taken to insure uniform wetting by sufficient agitation and if the oil content of the carbon is not too high (should be below 0.2%), water is much more efficient than most other liquids as an agent for promoting granulation of black because it combines the characteristics of relatively high surface tension (73 dynes per $cm^2$ at 20° C.) and not too low a dielectric (81), which seems necessary in order to insure that the black be wetted without too much difficulty while at the same time producing a product having a higher uniform density and stronger texture than would be obtainable using a liquid such as acetone, with surface tension 23 and dielectric 26.6. Some liquids of lower dielectric are more efficient wetting agents but are nevertheless not as efficient as agglomerating agents. By blending two miscible liquids such as water and acetone, the wetting efficiency can be increased at the sacrifice of a proportionate reduction in the strength and density of the finished granular product. It has been found that liquids possessing a specific inductive capacity (dielectric) less than 10 (based on wave lengths above 10,000 cm.)

are not suitable for a wetting agent and cause the black to form a pasty mass which will not form granules. For normal operation water is the most suitable liquid.

In the mixer 18 the dry black is partially wetted with about an equal weight of water, the action of the rotating fingers or bars 22 being to drag drops of water through the black, thereby gradually wetting the particles and coalescing and compacting them with the aid of surface tension and dielectric effects into small spherical agglomerate nuclei of such small size as to readily pass a 100 mesh screen. Further agitation and compacting in the agitator 30 agglomerates these nuclei into grains of somewhat rough but porous surface, varying in size between approximately 8 and 40 mesh. While the grains are non-dusting, their outer surface is rough and any unagglomerated black readily adheres thereto. When grains of the finished and dried granular product are broken and viewed under a microscope, they will be found to consist of an irregular pattern of compacted nuclei which is uniform throughout both as to porosity and density, as shown by Fig. 2.

Rubber tests comparing treated black and untreated black show that the granular form disperses with about the same rise in internal temperature as the original black and that the power requirement to mill the granular form into a compound is about 15% lower.

The invention having thus been described, what is claimed as new is:

1. The continuous process of treating flocculent carbon black to produce a free-flowing non-dusting granular product, which comprises increasing the apparent density of the black to about 12 pounds per cu. ft. by feeding it under mechanical stirring and pressure through a horizontally disposed tubular conveyer, thereafter wetting the dry pre-densed black with approximately 48% by weight of the mixture of water and agitating the wetted mixture to form agglomerate granular nuclei while selectively removing said nuclei from the wetting zone, further agglomerating the nuclei by agitation and gravity classification to produce free-flowing substantially uniform granules, and drying said granules by moving them rapidly through a drying gas atmosphere maintained at a temperature of approximately 400° F.–600° F.

2. The continuous process of treating flocculent carbon black to produce a free-flowing non-dusting granular product, which comprises increasing the apparent density of the black to at least 12 pounds per cu. ft. by feeding it under pressure through a tubular conveyer, thereafter agitating the black and water in the proportions of 47–49% water to 53–51% black under controlled conditions of agitation to effect wetting, formation of granular nuclei, and selective removal of said nuclei from the wetting zone, further agglomerating the nuclei by agitation and gravity classification to produce free-flowing substantially spherical granules, and drying said granules.

3. The continuous process of treating flocculent carbon black to produce a free flowing non-dusting granular product of greatly increased density which comprises, feeding the black under mechanical agitation through a horizontally disposed confined path while gradually wetting the dry black with approximately 35%–65% by weight of the mixture of water to form agglomerate granular nuclei, the agitation and advancing of the mixture through the wetting zone being effected by subjecting the mixture to impacts at an average rate of four to eight per second per linear inch of path, imparting said impacts by a plurality of metallic fingers mounted along the path in closely spaced linear and angular relation and moving at high speed in a direction transversely of the direction of advancing movement of the mixture, the speed of movement and spacing of the fingers being such as to keep the black and water in a state of finely divided suspension during the wetting and granular nuclei forming operation, and further agglomerating the nuclei by agitation at a rate about half that employed in the wetting zone to produce free flowing granules of approximately 8–40 mesh size, and drying said granules.

4. The continuous process of treating flocculent carbon black to produce a free flowing non-dusting granular product which comprises, feeding the black under mechanical agitation through a horizontally disposed confined path having a length to perimeter ratio of about 1–1 while gradually wetting the dry black with finely atomized water in the proportions of 35%–65% water by weight of black to form agglomerate granular nuclei, agitating and advancing the mixture through the wetting zone by subjecting it to impacts at an average rate of four to eight per second per linear inch of path, imparting said impacts by a plurality of metallic fingers mounted along the path with a linear spacing of about one and one-half inches and an angular spacing of about twenty-two and one-half degrees (22½°), said fingers rotating at high speed in a transverse direction to the direction of advancing movement of the mixture, the speed of movement and spacing of the fingers being such as to keep the black and water in a state of finely divided suspension during the wetting and granular nuclei forming operation, further agglomerating the nuclei while advancing them through a path extension by agitation at a rate about half that employed in the wetting zone to produce free flowing substantially spherical granules of approximately 8–40 mesh size, and drying said granules.

5. The continuous process of treating flocculent carbon black to produce a free flowing non-dusting granular product which comprises, increasing the apparent density of the black to about twelve pounds per cubic foot by feeding it under mechanical stirring and pressure through a tubular conveyor, thereafter agitating the black with a single phase liquid having a specific inductive capacity greater than 10 and a surface tension preferably above 20 in the proportions of 35%–65% of liquid by weight of black, effecting the agitation and advancing of the mixture through the wetting zone by subjecting the mixture to impacts at an average rate of four to eight per second per linear inch of path, the speed of movement and spacing of the impacting elements being such as to keep the black and liquid in a state of finely divided suspension during the wetting operation thereby forming granular nuclei, removing said nuclei from the wetting zone, further agglomerating the nuclei by agitation at a rate not substantially more than half that employed in the wetting zone to produce free flowing substantially spherical granules, and drying said granules.

CARL W. SNOW.
GEORGE L. HELLER.